No. 896,726. PATENTED AUG. 25, 1908.
D. HALLIDAY.
BELT GUIDE AND SHIFTER.
APPLICATION FILED APR. 17, 1908.
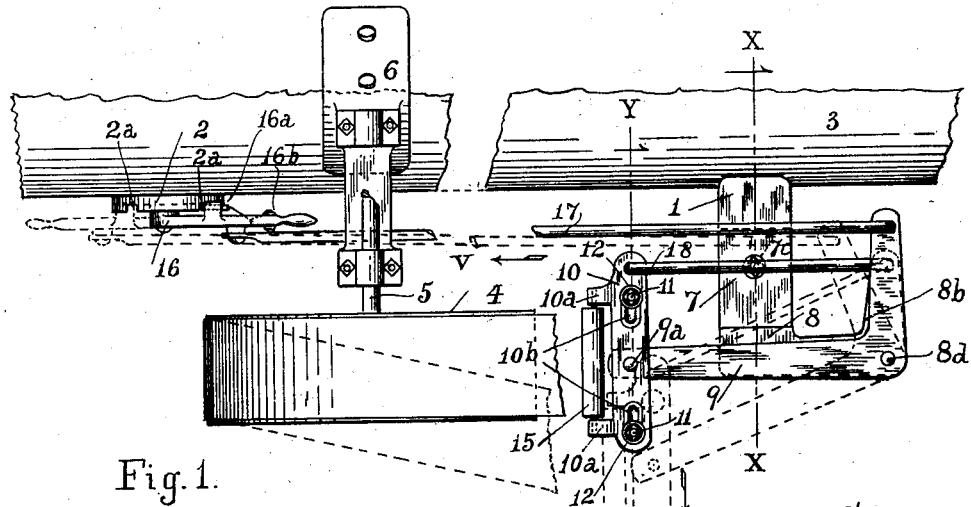
Fig. 1.
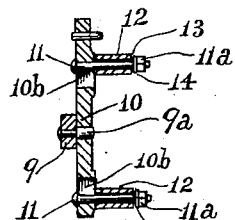
Fig. 5.
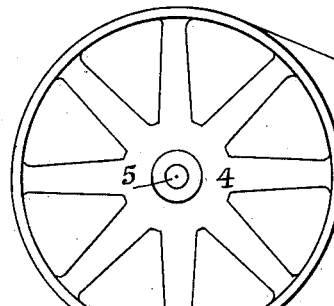
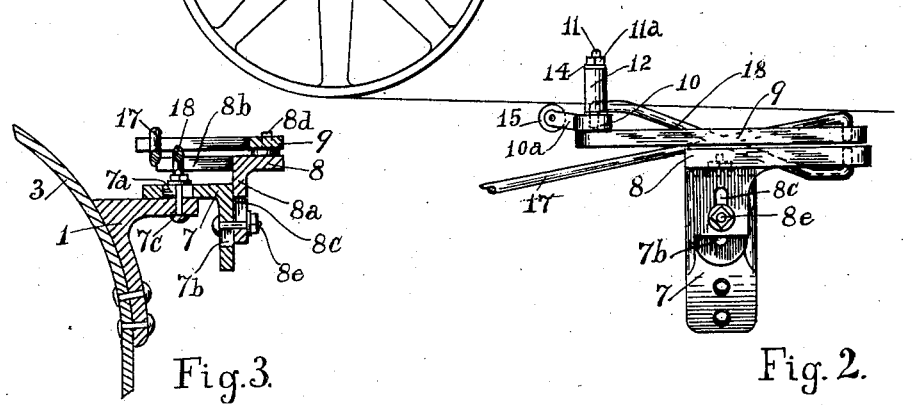
Fig. 3. Fig. 2.
Witnesses.
Joseph Kenning
James McGavin
Inventor.
DAVID HALLIDAY.
By Atty N. DuBois.

UNITED STATES PATENT OFFICE.

DAVID HALLIDAY, OF SHIPMAN, ILLINOIS.

BELT GUIDE AND SHIFTER.

No. 896,726.   Specification of Letters Patent.   Patented Aug. 25, 1908.

Application filed April 17, 1908. Serial No. 427,604.

*To all whom it may concern:*

Be it known that I, DAVID HALLIDAY, a citizen of the United States, residing at Shipman, in the county of Macoupin and State of Illinois, have invented a new and useful Belt Guide and Shifter, of which the following is such a full, clear, and exact description as will enable others skilled in the art to make and use my said invention.

The belt-guide and shifter, herein set forth, is especially adapted for use in connection with traction engines, such as are commonly used to operate threshing machines, corn shellers, and other farm machinery.

The purposes of the invention are to provide a belt-guide and shifter connected with the engine in such a manner that the engineer on the foot board may control the shifting of the belt; to provide means for vertical and horizontal adjustment of the lever-support; and to provide means to maintain parallelism of the belt-guide during the shifting of the belt.

The invention consists in the novel features of construction and combinations of parts shown in the annexed drawing, and hereinafter particularly described and finally recited in the claims.

Referring to the drawing in which similar reference numerals and characters designate like parts in the several views; Figure 1 is a top plan of the complete apparatus, and shows in dotted lines the changed position of the parts when the lever is pulled to throw off the belt; Fig. 2 is a partial side elevation, of the apparatus, the quadrant and the operating lever being omitted from this view. Fig. 3 is a vertical transverse section on the line X. X. of Fig. 1; Fig. 4 is an isometric projection of a modified form of lever-support and the extension connecting it with the supporting bracket; and Fig. 5 is a vertical section on the line Y. Y. of Fig. 1.

The bracket 1 and the quadrant 2 are suitably secured on the boiler 3. The wheel, 4, on which the belt runs, is secured on the shaft 5 and the shaft turns in suitable bearings on a support 6 fixed on the boiler 3. An L-shaped extension 7 has in its horizontal member a slot $7^a$ and in its vertical member a slot $7^b$. The lever-support comprises a horizontal plate 8, a vertical leg $8^a$ integral with the plate, and provided with a slot $8^c$, and a horizontal arm $8^b$ integral with the plate 8. A bolt $7^c$ extends through the bracket 1 and through the slot $7^a$ in the extension 7 and connects the extension with the bracket so that the extension may be adjusted inward or outward on the bracket. A bolt $8^e$ extends through the slot $7^b$ in the extension 7 and through the slot $8^c$ in the member $8^a$ of the lever-support 8 and connects the lever-support with the extension so that the lever-support may be adjusted upward or downward on the extension. A bell-crank lever 9 turns on a pivot $8^d$ on the lever-support 8. The guide-bar 10 oscillates on a pivot $9^a$ on the bell-crank lever 9 and has lugs $10^a$ and slots $10^b$. Bolts 11 extend through the slots $10^b$ and through thimbles 13 within the rollers 12. Washers 14 bear against the ends of the thimbles 13 and are secured by nuts $11^a$. The rollers 12 turn on the thimbles 13 and guide the edges of the belt running in contact with the rollers. By loosening the nuts $11^a$ the bolts 11 may be slid in the slots $10^b$ to adjust the rollers to suit belts of different widths. A revoluble roller 15 is mounted on and turns between the lugs $10^a$ and supports one side of the belt running thereon. A lever 16 pivoted on the quadrant 2 has a latch $16^a$ operated by a grip lever $16^b$ and adapted to engage in notches $2^a$ in the quadrant 2. A rod 17 connects the lever 16 with the bell-crank lever 9. A rod 18 connects the guide-bar 10 with the member $8^b$ of the lever-support.

In Fig. 1 the lever-support 8 is shown as connected with the outer end of the extension 7. It may, however, be connected with the side of the extension as shown in Fig. 4. In that view the extension 7' has a downwardly extending integral slotted member 7''. The lever-support 8' has an integral downwardly extending slotted member 8'' fitting on the member 7'' and also has a laterally extending member $8^{b\prime}$ corresponding to the member $8^b$ shown in Fig. 1. A bolt $7^{c\prime}$ connects the extension 7' with the bracket 1 and a bolt $8^{e\prime}$ connects the lever-support 8' with the member 7'' of the extension 7', and the extension is horizontally adjustable on the bracket and the lever-support is vertically adjustable on the extension as already described.

The operation is as follows: If the lever 16 be pulled to the left it will pull on the rod 17 and move it in the direction indicated by the arrow V and cause the bell-crank lever 9 to turn on its pivot $8^d$ and thereby move the guide-bar 10 and connected parts in the direction indicated by the arrow W. When the parts are moved as described the rod 18 will act on the bar 10 to cause it to maintain a position parallel to its initial position as clearly shown by dotted lines in Fig. 1.

Having fully described my invention, what I claim as new and desire to secure by Letters Patent is:

1. In a belt-guide and shifter, the combination of a bracket fixable on a boiler, an extension horizontally adjustable on said bracket, a lever-support vertically adjustable on said extension and having an arm, a bell-crank lever oscillative on said lever-support, a guide-bar oscillative on said bell-crank lever, means on said guide bar, for guiding the edges of a belt, a notched quadrant fixable on a boiler, a lever equipped with a latch engaging the notches in said quadrant, a connecting rod connecting said lever with said bell-crank lever and a rod connecting said guide-bar with the arm on said lever-support.

2. In a belt-guide and shifter, the combination of a lever-support provided with an arm, a horizontally oscillative bell-crank lever mounted on said lever-support, means for oscillating said bell-crank lever, a guide-bar pivotally connected with said bell-crank lever and provided with slots, bolts extending through the slots in said guide-bar, thimbles on said bolts, rollers turning on said thimbles and means for connecting said guide-bar with said lever-support.

3. In a belt-guide and shifter, the combination of a lever-support having an arm, a bell-crank lever oscillative on said lever-support, means for oscillating said bell-crank lever, a guide-bar oscillative on said bell-crank lever, a connecting device connecting the guide-bar with the arm of said lever-support and rollers adjustable on said guide-bar to fit belts of different widths.

4. In a belt-guide and shifter, the combination of a lever-support having an arm, a bell-crank lever oscillative on said lever-support, a guide-bar oscillative on said bell-crank lever, a horizontal roller on said guide bar for supporting the belt, vertical rollers on said guide bar, for guiding the belt, and a connecting device connecting said guide-bar with the arm of said lever-support.

In witness whereof I have hereunto signed my name at Shipman, Illinois, this 13th day of April, 1908.

DAVID HALLIDAY.

Witnesses:
J. H. KELSEY,
J. O. CHRISTOPHER.